No. 818,987. PATENTED APR. 24, 1906.
T. H. WHELESS.
AUTOMOBILE TORPEDO.
APPLICATION FILED OCT. 12, 1903.

Inventor
T. H. Wheless

No. 818,987. PATENTED APR. 24, 1906.
T. H. WHELESS.
AUTOMOBILE TORPEDO.
APPLICATION FILED OCT. 12, 1903.
5 SHEETS—SHEET 4.

Witnesses
Geo. H. Byrne.
L. Bunz.

Inventor
T. H. Wheless,
By Wilkinson & Fisher
Attorneys.

UNITED STATES PATENT OFFICE.

THOMAS HENRY WHELESS, OF NEW YORK, N. Y.

AUTOMOBILE TORPEDO.

No. 818,987.  Specification of Letters Patent.  Patented April 24, 1906.

Application filed October 12, 1903. Serial No. 176,766.

*To all whom it may concern:*

Be it known that I, THOMAS HENRY WHELESS, a citizen of the United States, residing at New York city, in the borough of Manhattan and State of New York, have invented certain new and useful Improvements in Automobile Torpedoes, (Case C;) and I do hereby declare the following to be a full, clear, and exact description of the invention, such as will enable others skilled in the art to which it appertains to make and use the same.

My invention relates to improvements in automobile torpedoes; and it is intended to provide improved mechanism for steering the torpedo or guiding it in the horizontal plane.

My invention will be understood by reference to the accompanying drawings, in which the same parts are indicated by the same letters throughout the several views.

Fig. 3 is a central vertical section through a part of the tail of the torpedo, the same being along the line 3 3 of Fig. 4 and looking in the direction of the arrows. Fig. 3$^a$ is a detail illustrative of part of the mechanism for spinning up the gyroscope. Fig. 5 is a detail showing the arrangement of levers for operating the immersion-rudders. Fig. 5$^a$ shows the immersion-rudders in plan. Fig. 6 is a horizontal section through the two cylinders of the steering-engine. Fig. 7 is a cross-section through the two cylinders of the steering-engine along the line 7 7 of Fig. 6, the valve being shown in elevation. Fig. 8 shows diagrammatically the connection between the piston-rods of the steering-engine and the steering-rudders.

The torpedo is intended to be operated by compressed air or gas and consists of three main parts: the head A, with the explosive and firing device; the middle part A', containing the air-flask, and the after part A$^2$, containing the propelling mechanism and the means for controlling the immersion of the torpedo, as also the means for steering the same in the horizontal plane. The head A is detachable, and for exercise practice a special head can be used, which is provided with a calcium-phosphid pocket $a'$ and a depth-register pocket $a^2$, similar to those used in other types of torpedoes. On the nose of the head A is a nose-tube with screw-fans $a$, which if used on the war-head will cock the firing-pin during the first part of the running, as is well known in the art. Through the middle of the head passes the primer-case, (not shown,) which is surrounded by the explosive, as in the other well-known types of automobile torpedoes.

The compressed-air flask B is made of rolled steel, with two strong end caps, and can be charged by the inlet-valve $b$ in the top of the middle part of the torpedo.

The mechanism pertaining to my present invention is included in the tail portion A$^2$ of the torpedo and will now be described.

Figure 1:
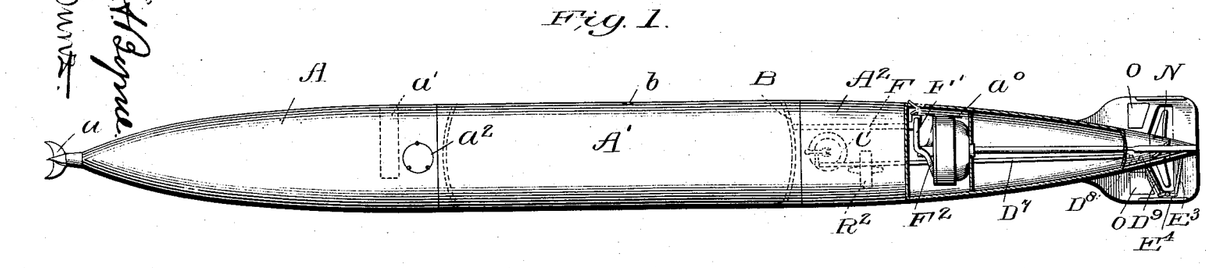
Figure 1 is a side elevation of the torpedo, part of the tail being broken away.
Figure 2:
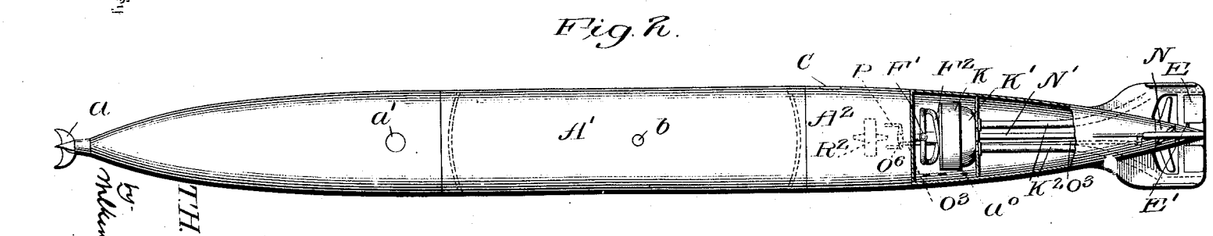
Fig. 2 is a plan view of the torpedo, part of the tail also being broken away.
Figure 4:
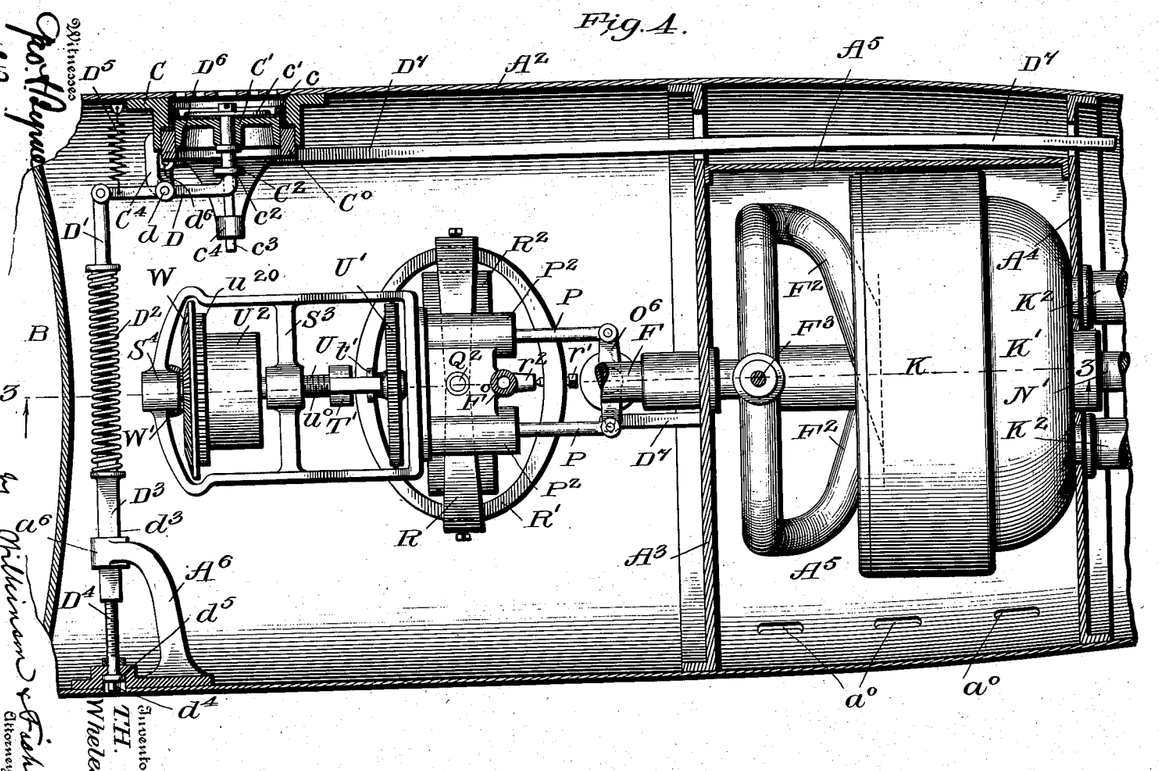
Fig. 4 is a plan view, partly in section, of the diving, steering, and propelling mechanism contained in the tail of the torpedo, the torpedo-shell being shown in section.
Figures 5, 5A, 6, 7, 8:
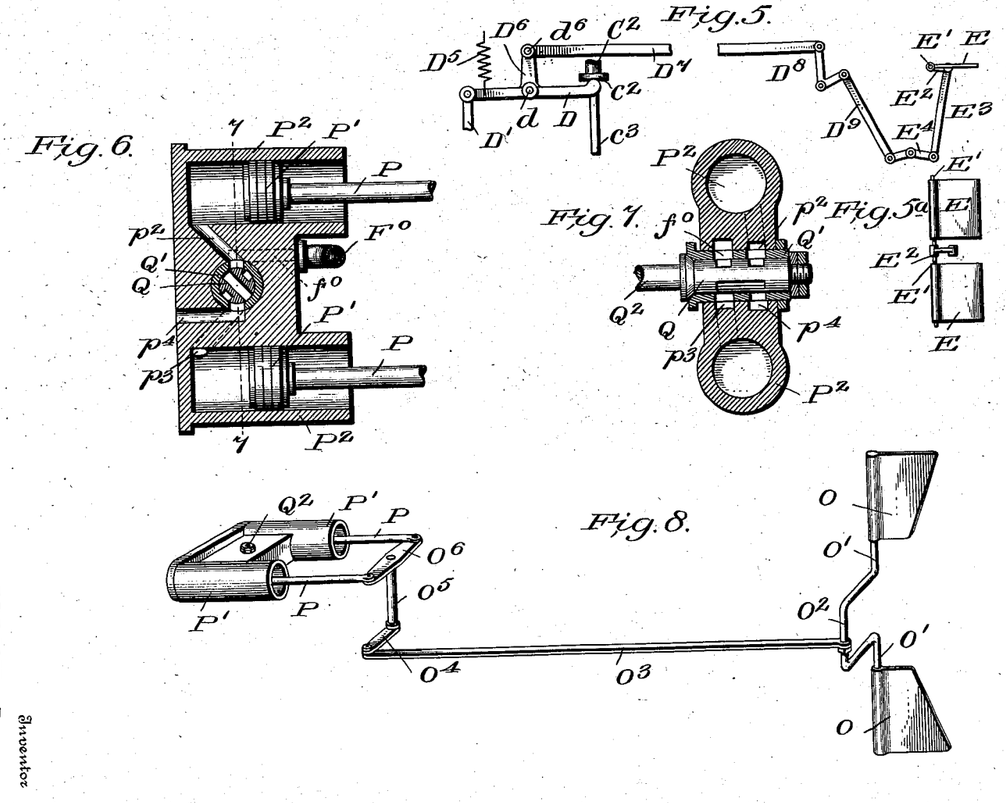

C represents a flanged hollow cylinder which is secured to the shell of the torpedo, which shell is perforated in front of said cylinder, as shown in Fig. 4, to permit the influx of water. In this cylinder is mounted a piston C', fast to the piston-rod C$^2$, and this piston travels freely in the ring C$^0$ and has secured to its face a flexible diaphragm $c$, held to the face of the piston by the washer $c'$ and clamped in the cylinder C by the ring C$^0$. Thus this piston is free to move longitudinally in the cylinder, while the diaphragm prevents the passage of water therethrough. The piston-rod C$^2$ carries a projecting arm $c^2$ and is provided with a tail $c^3$, passing through a suitable guide $c^4$. (See Fig. 4.) Underneath this arm $c^2$ engages one end of the lever D, which is pivoted, as at $d$, in a suitable bracket C$^4$ and has its other end connected to the rod D', to which is secured the coil-spring D$^2$, the lower end of which spring is connected to the rod D$^3$, which is squared, as at $d^3$, to pass into the bearing $a^6$ in the bracket A$^6$. The end of this rod D$^3$ is screw-threaded internally to receive the screw D$^4$, which is provided with a collar $d^5$ and a squared head $d^4$, by means of which said screw may be turned, as by using an ordinary key, and thus the tension of the spring D$^2$ may be adjusted so as to have the immersion-piston set for the desired depth. A compensating spring D$^5$ is used to steady the immersion mechanism when the torpedo is running near the surface of the water; otherwise the spring D$^2$ would have to be so nicely adjusted that the parts would vibrate too much under the shock of discharge or when the torpedo strikes the water. By having a compensating spring the spring $D^2$ is always under initial tension. The lever D is fastened to a shaft $d$, which shaft carries the arm $D^6$, which is pivoted at $d^6$ to the connecting-rod $D^7$, which is pivotally connected to the bell-crank lever $D^8$, connected by the rod $D^9$ to the lever $E^4$, which lever is connected by the connecting-rod $E^3$ to the tiller $E^2$, fast to the shaft $E'$, to which both of the immersion-rudders are secured. (See Figs. 1, 5, and $5^a$.) Thus it will be seen that the piston $C'$ is acted upon by two forces—one, the pressure of the water tending to press the cylinder down; the other, the tension of the spring $D^2$ tending to push the piston up. If this spring be set at the desired tension corresponding to a predetermined depth pressure of the water, the diving-rudders may be kept horizontal at that depth and may be caused by the pressure of the water or of the tension of the spring to swing about the shaft $E'$, thus causing the tail of the torpedo to be pressed down or up, as the case may be, with the corresponding rising or descending of the torpedo relative to the surface of the water.

I am aware that somewhat similar constructions have been used for regulating the depth of the immersion of automobile torpedoes, in which the opposing forces of the pressure of the water and of the tension of a spring control the action of the diving-rudders; but I believe that the hereinbefore-described construction is simpler in its construction, more efficient in its action, and more readily adjusted than others now in use.

Having thus explained the action of the apparatus by means of which the diving-rudders are controlled, I next proceed to the description of the mechanism whereby the torpedo is propelled. This mechanism is most clearly shown in Figs. 3 and 4. The air-flask B is provided with an outlet-pipe F, controlled by the reducing-valve $F^3$, which valve is thrown into operation by the trigger G when the torpedo is launched and is kept open for a predetermined length of time by means of the clockwork mechanism H, when it is automatically closed by means of the spring $G'$. This clockwork mechanism is only used in trials of the torpedo where it is desired to limit its run, and thus more conveniently recover the torpedo when it floats to the surface after it has stopped running; but this clockwork mechanism in actual warfare might be omitted and the valve allowed to remain open until the torpedo is run down from the exhaustion of its supply of compressed air. Moreover, this clockwork mechanism not being a part of my present invention will not be further described herein. This pipe F opens into two branch pipes $F'$, forming two nozzles $F^2$ for compressed air, which nozzles open into the air-passages $m$ in the turbine M, which turbine is mounted in the casing K, connected by the casing $K'$ to the escape-pipes $K^2$, which deliver the air after it passes from the engine to the water in rear of the torpedo, and thus help to push the torpedo ahead. The turbine is mounted on a shaft $N'$, which carries the propeller N. This shaft is journaled in suitable bearing-blocks $K^3$ $K^4$, and its rear end $n$ is hardened to bear against a thrust-bearing screw $N^2$, made of hardened steel, or a piece of hardened steel may be inserted in the front end of the propeller-shaft to bear against the hardened screw. This construction diminishes the friction and lessens the wear.

Figure 9:
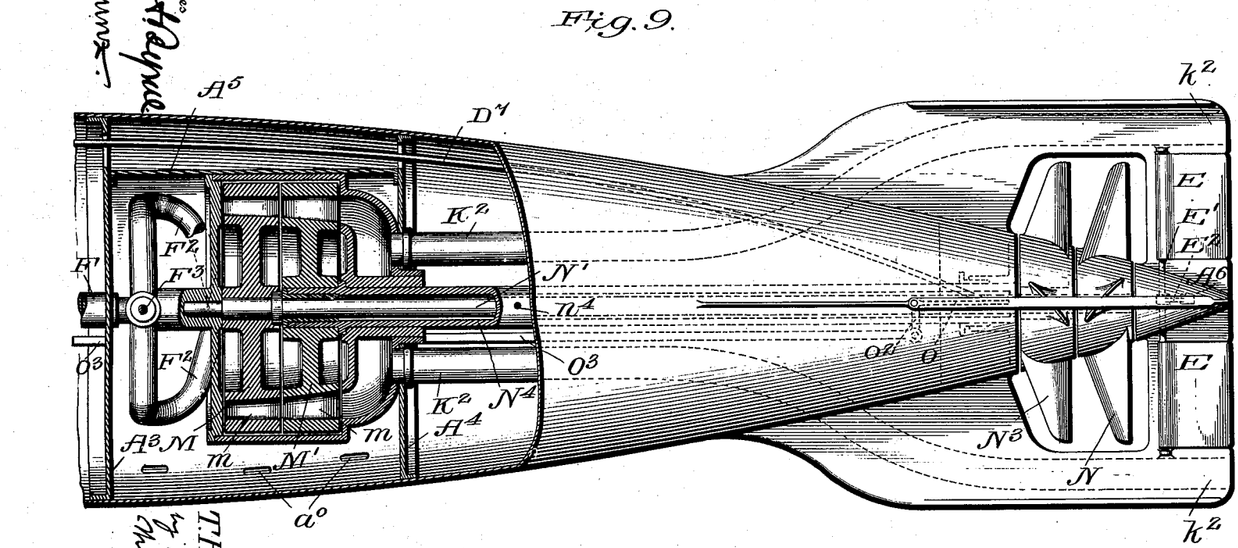
Fig. 9 shows two propellers driven by a compound turbine.

In the modification shown in Fig. 9 two turbine-wheels M and $M'$ are used having the vanes running in opposite directions, as is well known in the construction of compound turbines. The passage through the vanes is expanding, as shown, and the air after leaving the second turbine-wheel passes through the pipes $K^2$ and out astern of the torpedo, as at $k^2$. This pipe $K^2$ may be of any suitable shape so as, where water-borne, to reduce the resistance of the water, and the end $k^2$ may be flared out if desired to give a larger bearing-surface on the water of the escaping air. The forward turbine-wheel M is mounted on a shaft $N'$, generally similar to that already described with reference to Fig. 3, and on this shaft $N'$ the rear propeller N is secured. The forward propeller $N^3$ is mounted on a hollow shaft $N^4$, which is in the form of a sleeve and slips over the inner propeller-shaft. The blades of the propellers N and $N^3$ have their pitch reversed, so that they may be driven in opposite directions. By having two propellers, one astern of the other and rotating in opposite directions, the tendency of either propeller to slue the tail of the torpedo laterally, due to difference of pressure of the water corresponding to the depth of the blade, is largely obviated. Thus it will be seen that I provide a compound turbine operated by compressed air and driving two propellers in reverse directions, while the air after passing through the turbine passes out with the water astern of the torpedo, and hence assists in the propulsion thereof. In order to keep the inner shaft well lubricated, the annular space between the two propellers may be filled with any suitable lubricant, such as graphite and oil. A hole $n^4$ is provided for this purpose.

The construction of the torpedo shown in Fig. 9 is generally similar to that described with reference to the other figures. By having the driving engine or engines in the form of a turbine fast on the propeller-shaft a very high speed of the propeller is secured and a consequent high speed of the torpedo, and, moreover, a lighter engine can be used, thus enabling the torpedo to carry more compressed air and more explosive than if a heavier engine were used. Again, by having a turbine-engine instead of the reciprocating engine ordinarily used in automobile torpedoes less vibration and smoother running is secured.

While I have described compressed air as motive power for the engine, it will be obvious that any other compressed gas may be used.

Since gas in expanding cools, with corresponding loss of power, I preferably mount the casing K in a water-chamber in which water freely flows from the outside of the torpedo, as through the openings $a^0$, which water thus serves to warm up the said casing, and with it the compressed air operating the turbine. For this purpose I provide bulkheads $A^3$, $A^4$, and $A^5$, which form a water-chamber for the turbine and the air-pipes leading thereto. The same source of power that drives the turbine also drives the steering-engine, whose operation will now be described.

The steering-rudders O are connected to a common shaft $O'$, which is bent over the propeller-shaft in form of a crank $O^2$, connected by the connecting-rod $O^3$ to the crank $O^4$ on the shaft $O^5$, which carries the lever $O^6$, connected at each end to one of the piston-rods P of the steering-engine. (See Fig. 8.) These piston-rods are connected to the pistons $P'$ in the cylinders $P^2$, which cylinders are provided with passages $p^2$ and $p^3$, respectively, leading to the valve, and $p^4$, leading to the atmosphere or exhaust, (see Fig. 6,) and $f^0$, leading to the air-supply.

Figures 3, 3A:
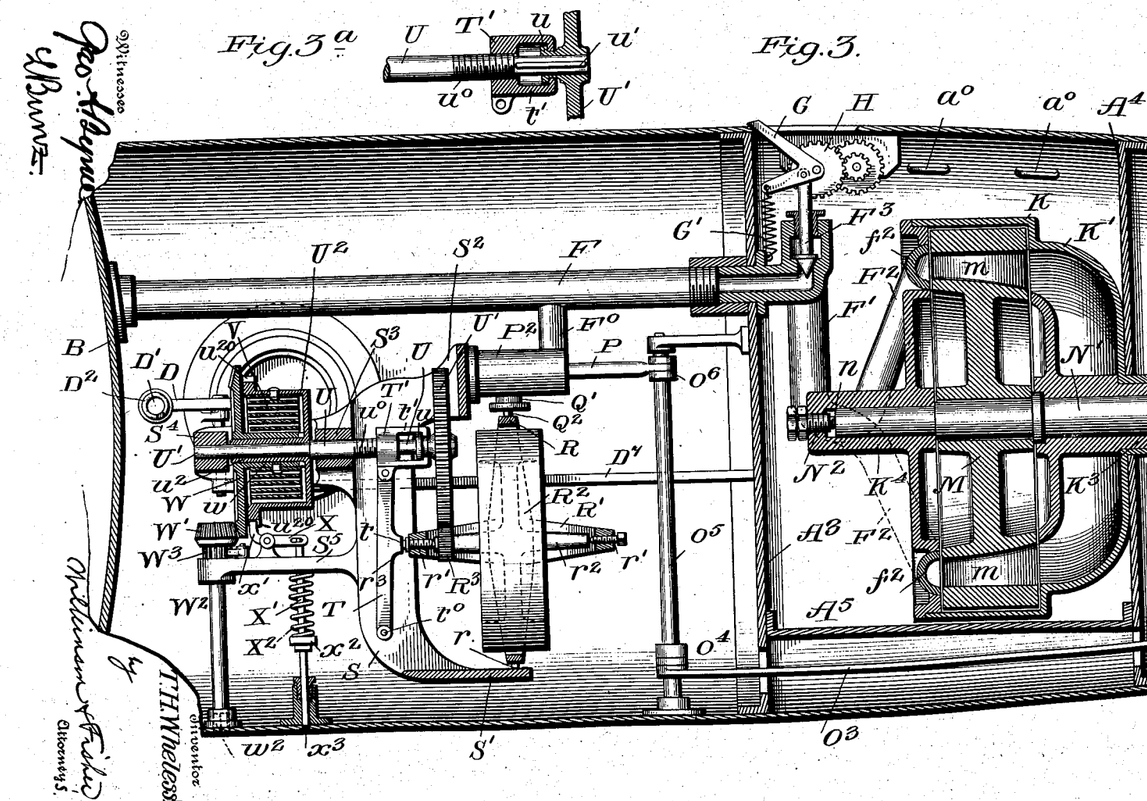

The plug-valve Q is mounted in a casing $Q'$, and the valve and its casing are provided with suitable passages whereby fluid-pressure from the pipe $F^0$, connected to the pipe F, will be admitted to either cylinder and at the same time the other cylinder will be connected to the exhaust. Thus these cylinders, which are single-acting, are operated alternately according to the position of the valve Q. This valve is carried on a valve-stem $Q^2$, which forms one of the journal-bearings of the outer gimbal-ring R of the gyroscope-governor, which will now be described. The opposite side of this gimbal-ring R is journaled, as at $r$, in the arm $S'$ of the bracket S, which bracket is fast to the shell of the torpedo. In this outer ring R of the gyroscope is journaled the inner ring $R'$, and in this inner ring the fly-wheel $R^2$ is journaled, as by means of the adjustable screw $r'$ engaging the ends of the shaft $r^2$ of the fly-wheel $R^2$. This shaft $r^2$ carries a pinion $R^3$, normally meshing in the spur-gear $U'$, which is splined, as at $u'$ on a shaft U, as shown in detail in Fig. $3^a$. This gear $U'$ is provided with a collar $u$, over which engage the arms $t'$ of the nut $T'$, which nut engages the screw-threads $u^0$ on the exterior of the shaft U. The gear-wheel $U'$ is adapted to slide on the shaft U, but is held against turning thereon, as shown in Fig. $3^a$, where $u'$ shows a spline on the shaft U. The nut is also pivotally connected to the lever T, which lever is pivoted at $t^0$ to the bracket S and is provided with a socket $t$ to receive the head of one of the pins $r'$, as shown in Fig. 3, whereby the axis of the fly-wheel is normally held in a fixed position relative to the axis of the torpedo.

The shaft U is reduced, as at $U'$, to receive the hub $u^2$ of the box $U^2$, containing the coil-spring V. One end of this spring is made fast to this box $U^2$, and the other end of the spring is made fast to the sleeve $w$, which is loosely mounted on the hub $u^2$ of the box $U^2$. This sleeve $w$ carries the bevel-gear W, which meshes with the bevel-pinion $W'$ on the shaft $W^2$, which is wound up from the exterior by means of a key fitting over the squared head $w^2$. (Shown in dotted lines in Fig. 3.) The shaft U is journaled in the arms $S^3$ and $S^4$ of the bracket S, and the shaft $W^2$ is journaled in the arm $S^5$ of said bracket. Pivoted to said arm $S^5$ is a lever X, which has a catch $x'$ engaging in the teeth $u^{20}$ on the exterior of the spring-box $U^2$. This catch $x'$ is normally thrown into engagement with the said teeth by means of the rod $X'$ and the spring $X^2$, which bears against a collar $x^2$ on said rod $X'$. The rod is continued down to the position indicated at $x^3$, so that it may be pressed upward from the outside of the torpedo, thus releasing the said catch $x'$ from the teeth $u^{20}$ and allowing the spring V to unwind. This releasing the catch is automatically done when the torpedo is launched. The unwinding of the spring causes the screw $u^0$ on the shaft U to withdraw the nut $T'$, thus withdrawing the notch $t$ from engagement with the head $r^3$ of the screw $r'$, and at the same time the spur-gear $U'$ is withdrawn from engagement with the pinion $R^3$, and thus the wheel $R^2$ is spun up, and immediately thereafter the gyroscope is left entirely free from disturbing forces, excepting the slight friction on the gimbals and the force required to turn the valve. The axis of the fly-wheel should be as nearly as practicable in the horizontal plane when the torpedo is launched, so as to secure the best directive effects. Thus it will be seen that the spur-gear $U'$ may be caused to revolve through a few revolutions, thereby spinning up the fly-wheel, and is then withdrawn from engagement with the axis of the fly-wheel, thus leaving the gyroscope free to maintain its fixity of direction. The number of turns made by the spur-gear $U'$ before it moves away from the pinion $R^3$ might be varied by varying the pitch of the screw-threads $u^0$. As the torpedo swerves to the right or left the valve will be held by the gyroscope in a substantially fixed direction, and thus air will be admitted to one or the other of the cylinders $P^2$, causing the torpedo to be steered in the opposite direction to that of its deflection, thus causing the torpedo to follow a sinuous course, but having a mean direction substantially the same as that with which the torpedo was first launched. The spring V is wound up by means of the shaft $V^2$ on the outside of the torpedo, as before described, and this shaft is prevented from turning backward after the spring has been wound up by means of any suitable ratchet-and-pawl arrangement, such as that shown at $W^3$ in Fig. 3.

Thus it will be seen that I have devised a simple mechanism easily operated from the exterior of the torpedo by means of which the gyroscope is spun up, and after the gyroscope is spun up it controls the steering-engine, having double cylinders with the valve located between the two, which cylinders alternately control the steering-rudders, and thus keep the torpedo on substantially the mean course toward the target.

It will be obvious that various means for causing the torpedo to run at a predetermined direction relative to the true course may be provided, if desired.

Having thus described my invention, what I claim, and desire to secure by Letters Patent in the United States, is—

1. In an automobile torpedo provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel, comprising a pinion fast on the axis of said fly-wheel, a spur-gear meshing in said pinion, means for automatically moving said spur-gear longitudinally out of engagement with said pinion as its shaft revolves, and spring-controlled mechanism for rotating said spur-gear, substantially as described.

2. In an automobile torpedo, provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel comprising a pinion on the axis of said fly-wheel, a spur-gear meshing in said pinion, means for automatically moving said spur-gear longitudinally out of engagement with said pinion as its shaft revolves, and spring-controlled mechanism for rotating said spur-gear, with means automatically operated by the launching of the torpedo for setting in operation said spring-controlled mechanism, substantially as described.

3. In an automobile torpedo provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel, comprising a pinion on the fly-wheel axis, a shaft with screw-threads thereon, a spur-gear splined on said shaft and engaging said pinion, a nut held on said shaft and engaging said screw-threads and automatically moving said spur-gear longitudinally out of engagement with said pinion as said shaft revolves, and spring-controlled mechanism for rotating said shaft, substantially as described.

4. In an automobile torpedo provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel comprising a pinion on the axis of said fly-wheel, a shaft with screw-threads thereon, a spur-gear splined on said shaft and engaging said pinion, a nut held on said shaft and engaging said screw-threads and automatically moving said spur-gear longitudinally out of engagement with said pinion as said shaft revolves, and spring-controlled mechanism for rotating said shaft, with means automatically operated by the launching of the torpedo for setting in operation said spring-controlled mechanism, substantially as described.

5. In an automobile torpedo provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel, comprising a pinion on the fly-wheel axis, a shaft with screw-threads thereon, a spur-gear splined on said shaft and engaging said pinion, a nut held on said shaft and engaging said screw-threads and automatically moving said spur-gear longitudinally out of engagement with said pinion as said shaft revolves, spring-controlled mechanism for rotating said shaft, with means for holding the axis of the fly-wheel in a fixed direction relative to the axis of the torpedo, and means automatically operated by the rotation of said shaft for releasing said axis, substantially as described.

6. In an automobile torpedo provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel comprising a pinion on the axis of said fly-wheel, a shaft with screw-threads thereon, a spur-gear splined on said shaft and engaging said pinion, a nut held on said shaft and engaging said screw-threads and automatically moving said spur-gear longitudinally out of engagement with said pinion as said shaft revolves, spring-controlled mechanism for rotating said shaft, with means automatically operated by the launching of the torpedo for setting in operation said spring-controlled mechanism, with means for holding the axis of the fly-wheel in a fixed direction relative to the axis of the torpedo, and means automatically operated by the rotation of said shaft for releasing said axis, substantially as described.

7. In an automobile torpedo provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel, comprising a pinion on the fly-wheel axis, a shaft with screw-threads thereon, a spur-gear splined on said shaft and engaging said pinion, a nut held on said shaft and engaging said screw-threads and automatically moving said spur-gear longitudinally out of engagement with said pinion as said shaft revolves, spring-controlled mechanism for rotating said shaft, a lever connected to said nut for holding the axis of the fly-wheel in a fixed direction relative to the axis of the torpedo, and automatically moved by the rotation of said shaft thus releasing said axis when the wheel is spun up, substantially as described.

8. In an automobile torpedo provided with steering-rudders, the combination with a steering-engine operating said rudders, of an air-flask and connections for supplying fluid-pressure to said engine, a valve for controlling said fluid-pressure, a fly-wheel mounted in gimbal-rings for controlling said valve, and means for spinning up said fly-wheel comprising a pinion on the axis of said fly-wheel, a shaft with screw-threads thereon, a fly-wheel splined on said shaft and engaging said pinion, a nut held on said shaft and engaging the screw-threads and automatically moving said spur-gear longitudinally out of engagement with said pinion as said shaft revolves, spring-controlled mechanism for rotating said shaft, with means automatically operated by the launching of the torpedo for setting in operation said spring-controlled mechanism, and means automatically operated by the rotation of said shaft for releasing said axis, a lever connected to said nut for holding the axis of the fly-wheel in a fixed direction relative to the axis of the torpedo, and automatically moved by the rotation of said shaft thus releasing said axis when the wheel is spun up, substantially as described.

9. In an automobile torpedo, the combination with an air-flask containing air or other gas under pressure, of a steering-engine comprising two cylinders connected to said air-flask, a valve mounted between said cylinders and adapted to supply fluid-pressure to one cylinder and to permit exhaust from the other cylinder, a gyroscope for holding said valve in a substantially steady position irrespective of the lateral swervings of the torpedo, pistons in said cylinders provided with piston-rods, steering-rudders pivoted to the torpedo, and a series of levers connecting said piston-rods with said rudders for turning said rudders by means of said steering-engine, substantially as described.

10. In an automobile torpedo, the combination with an air-flask containing air or other gas under pressure, of a steering-engine comprising two cylinders connected to said air-flask, a valve mounted between said cylinders and adapted to supply fluid-pressure to one cylinder and to permit exhaust from the other cylinder, a gyroscope for holding said valve in a substantially steady position irrespective of the lateral swervings of the torpedo, means for holding said gyroscope with its axis in a constant direction relative to the axis of the torpedo, and means for automatically spinning up said gyroscope and for releasing its axis, allowing it free motion when the torpedo is launched, pistons in said cylinders provided with piston-rods, steering-rudders pivoted to the torpedo, and a series of levers connecting said piston-rods with said rudders for turning said rudders by means of said steering-engine, substantially as described.

11. In an automobile torpedo, the combination with an air-flask containing air or other gas under pressure, of a steering-engine comprising two cylinders connected to said air-flask, a valve mounted between said cylinders and adapted to supply fluid-pressure to one cylinder and to permit exhaust from the other cylinder, a fly-wheel journaled in gimbals having its axis horizontal and its outer gimbal-ring secured to said valve at one of its pivots, means for normally holding the axis of said fly-wheel in a fixed direction relative to the axis of the torpedo and for releasing same when desired, and means for automatically spinning up the fly-wheel when the torpedo is launched, pistons in said cylinders provided with piston-rods, steering-rudders pivoted to the torpedo, and a series of levers connecting said piston-rods with said rudders for turning said rudders by means of said steering-engine, substantially as described.

12. In an automobile torpedo, the combination with an air-flask containing air or other gas under pressure, and a rotary engine driven thereby for propelling the torpedo, of a steering-engine comprising two cylinders connected to said air-flask, a valve mounted between said cylinders and adapted to supply fluid-pressure to one cylinder and to permit exhaust from the other cylinder, a gyroscope for holding said valve in a substantially steady position irrespective of the lateral swervings of the torpedo, pistons in said cylinders provided with piston-rods, steering-rudders pivoted to the torpedo, and a series of levers connecting said piston-rods with said rudders for turning said rudders by means of said steering-engine, substantially as described.

13. In an automobile torpedo, the combination with an air-flask containing air or other gas under pressure, and a rotary engine driven thereby for propelling the torpedo, of a steering-engine comprising two cylinders connected to said air-flask, a valve mounted between said cylinders and adapted to supply fluid-pressure to one cylinder and to permit exhaust from the other cylinder, a gyroscope for holding said valve in a substantially steady position irrespective of the lateral swervings of the torpedo, means for holding said gyroscope with its axis in a constant direction relative to the axis of the torpedo, and means for automatically spinning up said gyroscope and for releasing its axis, allowing it free motion when the torpedo is launched, pistons in said cylinders provided with piston-rods, steering-rudders pivoted to the torpedo, and a series of levers connecting said piston-rods with said rudders for turning said rudders by means of said steering-engine, substantially as described.

14. In an automobile torpedo, the combination with an air-flask containing air or other gas under pressure, and a rotary engine driven thereby for propelling the torpedo, of a steering-engine comprising two cylinders connected to said air-flask, a valve mounted between said cylinders and adapted to supply fluid-pressure to one cylinder and to permit exhaust from the other cylinder, a fly-wheel journaled in gimbals having its axis horizontal and its outer gimbal-ring secured to said valve at one of its pivots, means for normally holding the axis of said fly-wheel in a fixed direction relative to the axis of the torpedo and for releasing same when desired, and means for automatically spinning up the fly-wheel when the torpedo is launched, pistons in said cylinders provided with piston-rods, steering-rudders pivoted to the torpedo, and a series of levers connecting said piston-rods with said rudders for turning said rudders by means of said steering-engine, substantially as described.

15. In an automobile torpedo, the combination with an air-flask containing air or gas under pressure, of a steering-engine comprising a casing containing two cylinders, each cylinder open at one end and also connected to said air-flask by passages in said casing, a valve mounted in said casing between said cylinders and adapted to supply fluid-pressure to one cylinder and to permit exhaust from the other cylinder, a gyroscope for holding said valve in a substantially steady position irrespective of the lateral swervings, pistons in said cylinders provided with piston-rods, steering-rudders pivoted to the torpedo, and a series of levers connecting said piston-rods with said rudders for turning said rudders by means of said steering-engine, substantially as described.

In testimony whereof I affix my signature in presence of two witnesses.

THOMAS HENRY WHELESS

Witnesses:
JAS. H. BLACKWOOD,
M. M. O'CONNOR.